(12) United States Patent
Morcillo Barjola

(10) Patent No.: US 9,545,937 B2
(45) Date of Patent: Jan. 17, 2017

(54) SHOPPING CART

(71) Applicant: INDUSTRIAS TOMAS MORCILLO, S.L., Albuixech (Valencia) (ES)

(72) Inventor: Tomás Morcillo Barjola, Albuixech (ES)

(73) Assignee: Industrias Tomas Morcillo, S.L., Albuixech (Valencia) (ES)

( * ) Notice: Subject to any disclaimer, the term of this patent is extended or adjusted under 35 U.S.C. 154(b) by 0 days.

(21) Appl. No.: 14/761,717

(22) PCT Filed: Jan. 28, 2014

(86) PCT No.: PCT/ES2014/070059
§ 371 (c)(1),
(2) Date: Jul. 17, 2015

(87) PCT Pub. No.: WO2014/118414
PCT Pub. Date: Aug. 7, 2014

(65) Prior Publication Data
US 2015/0321688 A1    Nov. 12, 2015

(30) Foreign Application Priority Data
Jan. 29, 2013 (ES) ................. U201330089

(51) Int. Cl.
*B62B 3/16* (2006.01)
*B62B 5/06* (2006.01)

(52) U.S. Cl.
CPC ............... *B62B 3/165* (2013.01); *B62B 5/067* (2013.01); *B62B 2501/065* (2013.01)

(58) Field of Classification Search
CPC ............... B62B 1/006; B62B 1/12; B62B 3/16
See application file for complete search history.

(56) References Cited

U.S. PATENT DOCUMENTS

| | | | |
|---|---|---|---|
| 4,046,394 A * | 9/1977 | Thompson, Jr. ........ | B62B 3/144 280/33.991 |
| D608,073 S | 1/2010 | Alves et al. | |
| 2003/0116933 A1* | 6/2003 | Nadeau ................... | B60B 1/006 280/33.991 |
| 2012/0326405 A1* | 12/2012 | Overland ................ | B62B 1/006 280/33.998 |

FOREIGN PATENT DOCUMENTS

| | | |
|---|---|---|
| EP | 2468604 A1 | 12/2010 |
| EP | 2412606 A1 | 2/2012 |
| ES | 1064029 U | 2/2007 |
| ES | 2288138 A1 | 12/2007 |

(Continued)

*Primary Examiner* — Erez Gurari
(74) *Attorney, Agent, or Firm* — Richard M. Goldberg

(57) ABSTRACT

A shopping cart includes side walls (81) and a base (8), wherein the cart has an essentially truncated cone shape with a small divergence that allows the stacking thereof, the cart being formed essentially from two parts, a first part including the body of the cart (1) and a second part including the body of the handle (1), wherein the body of the cart includes receiving elements (6) for securing the body to the handle (11) in a permanent and stationary manner and because the body of the handle (11) includes, on the lower end thereof, an arrangement for fixing into the receiving element (6) of the body of the cart (1).

20 Claims, 10 Drawing Sheets

(56) References Cited

FOREIGN PATENT DOCUMENTS

| ES | 1068325 U | 10/2008 |
|----|-----------|---------|
| ES | 1069962 U | 5/2009 |
| ES | 1071230 U | 2/2010 |
| ES | 2368966 T3 | 4/2010 |
| ES | 1073674 U | 1/2011 |
| ES | 2352776 A1 | 2/2011 |
| FR | 2906212 A1 | 3/2008 |
| WO | 2008152581 A1 | 12/2008 |
| WO | 2010106214 A1 | 9/2010 |
| WO | 2010109048 A1 | 9/2010 |
| WO | 2011110976 A2 | 9/2011 |

* cited by examiner

SHOPPING CART

BACKGROUND OF THE INVENTION

This invention consists of a shopping basket specially designed to be used at such establishments as supermarkets, at which one of these baskets is usually taken by the entrance and then deposited again when empty in the checkout zone.

These baskets have to be stackable to allow a large number of baskets to take up relatively little space.

These baskets are also provided with a pulling handle. This handle can be retractable or form a single piece with the basket. Unlike the baskets mentioned, this invention describes a shopping basket which is made in two main parts, one forming the body of the basket, and the other forming the handle, which will be fitted on the basket to form a single unit with a fixed handle; the basket is provided with wheels for pulling it along, lifting handles and a perimeter skirt providing a cleaner appearance and a means of avoiding overturning which baskets existing up to now have not had.

STATE OF THE ART

Baskets of this type have been made for some time, though with characteristics unlike the ones being proposed. In any event, these are always stackable baskets provided with wheels for pulling along and a handle for gripping them.

ES 1064029 U describes a basket which has a hinged handle in the centre of its two most distant sides with wheel support cubes, in which two front wheels and two rear wheels, different from each other, are designed.

ES 1071230 U describes a basket to carry items at supermarkets and self-service shops, made of plastic material, in which there is an extendible handle along the rear wall, provided with handles made in the basket itself for manual lifting and fitted with two front wheels and a rotating rear wheel.

ES 1073674 describes a shopping trolley which forms a basket similar to the previous one, in which the handle can be withdrawn and used by extending this along the top edge.

ES 2368966 T3 describes a trailer assembly for shopping and conversion set to convert a shopping basket into said trailer assembly, in which there is a hinged handle on one of its edges, fitting flush with the upper edge of the basket in its withdrawal, this basket being stackable as for the previous cases.

WO 2010/109048 A1 describes a basket for shopping with extractable pulling handle, in which the handle is extended in parallel to the rear wall of the basket, and through cutaways made in the angles formed by the rear wall and the side walls, in which a system for retaining the handle in its extended position is included. This same solution can essentially be found in ES 2352776.

ES 2288138 describes a shopping basket with a pulling handle and rolling system defining recesses for sliding the handle of the previous invention.

WO 2010/106214 discloses a stackable basket for shopping, with wheels at the base in which there are recesses for coupling the wheels;

ES 1069962 U discloses a shopping basket which comprises housings for housing wheels on an exchangeable basis.

ES 1068325 U discloses a metal shopping basket for shopping centres and similar, with an extendible handle.

EP 2468604 A1 describes a shopping trolley (a basket) in which the handle is made as a single piece with the basket.

In almost all the previous cases there is a problem with assembling the handle, which requires some labour and the extendible handles also tend to malfunction over time; on the other hand, handles formed as a single piece require the colour of the handle and basket to be the same, which prevents personalising the trolleys with corporate colours at many shops; furthermore, the handle, made of plastic material, is a weak part of the trolley, receiving a large number of impacts, for which reason, in the event of this being made in a single piece, its breakage implies that the whole trolley has to be withdrawn from service with no possibility of being repaired.

SUMMARY OF THE INVENTION

This invention describes a stackable basket for shopping, made of a plastic material. In this the body of the basket and the handle have been made as separate items and it comprises a lower anchorage end on the corresponding housings made in the body of the basket. After being joined these form a single body with a fixed handle. This comprises lateral handles conceived for manually lifting the shopping trolley. The base is fitted with two sets of wheels. A first front set, close to the lower rear edge, and a second set in a zone close to the front lower edge. The lower part comprises a perimeter skirt which has several roles, a first function for safety, insofar as it establishes a turning stop in the event of the wheels coming up against any obstacle and the basket tipping. In this case it will lean on the skirt before being made to overturn; another of its purposes is for hygiene, since being protected by this skirt means that the lower surface of the base of the basket picks up less dirt, and the dirt that it collects is less visible from the outside. It also has an aesthetic function through providing a covering for the dirty part, more difficult to dirty and easier to clean.

The walls are formed of a grille, in which each cell of the grille is made up of a thick perimeter wall, in which there are no sharp edges, which are indeed found in the perforated walls of the baskets found on the market corresponding to some of the aforementioned inventions.

Furthermore, since the handle is independent, in the event of the handle being broken, which is what is most likely to happen, it is enough to replace this by extracting the damaged one and simply fitting a new one in the same place. Furthermore, through being made as separate pieces this means they can be made in colour combinations, being able to adapt more suitably to the colours or the corporate image of the company which uses them.

BRIEF DESCRIPTION OF THE DRAWINGS

In order to illustrate the following explanation, we are attaching to this descriptive report ten sheets of drawings, in which ten figures represent the essence of this invention as an example, and in which.

DESCRIPTION OF THE PREFERENTIAL FORM OF EMBODIMENT

Figure 1:
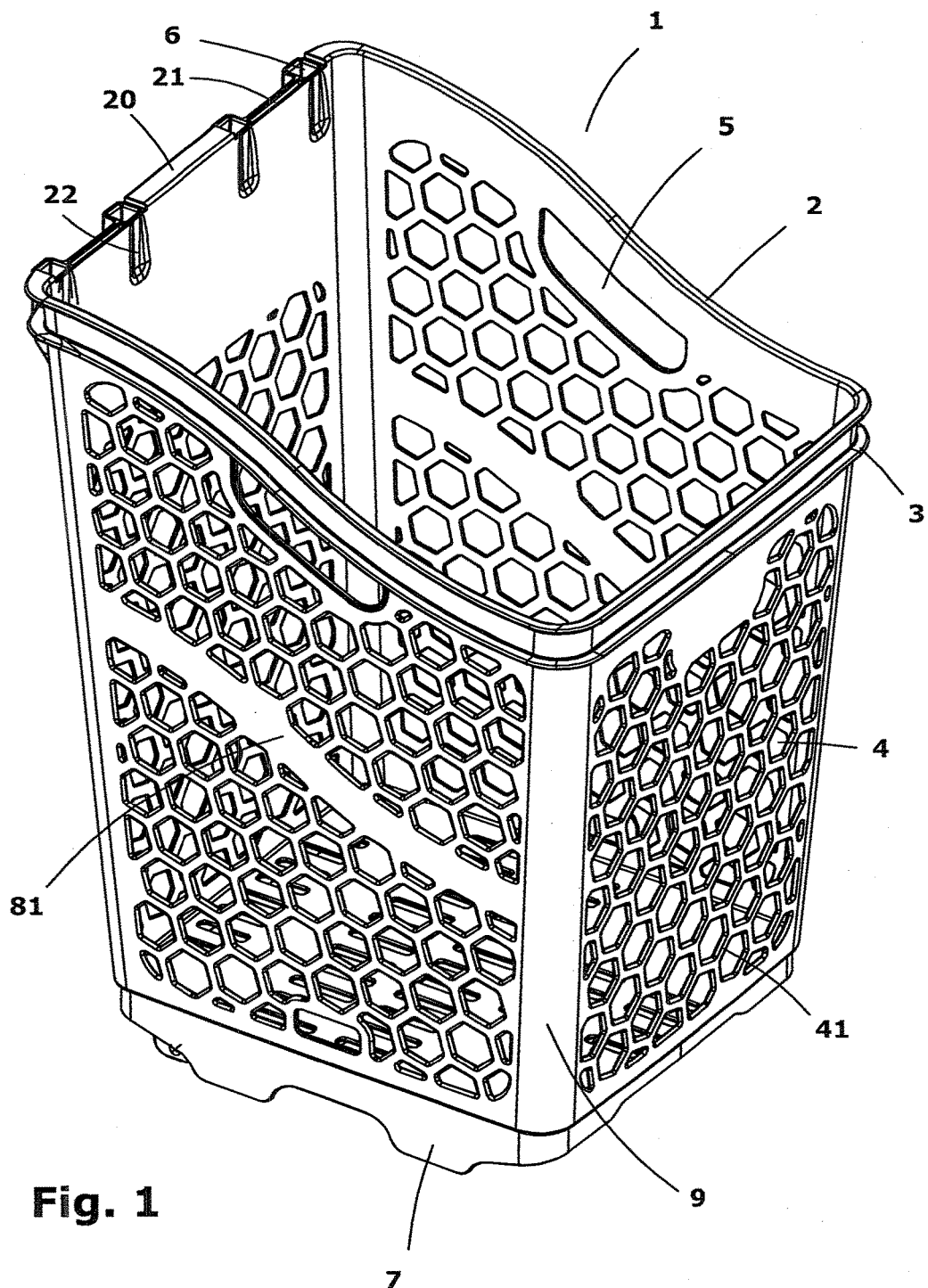
FIG. 1 shows a schematic upper perspective view of the shopping basket according to the invention, without its handle.
Figure 2:
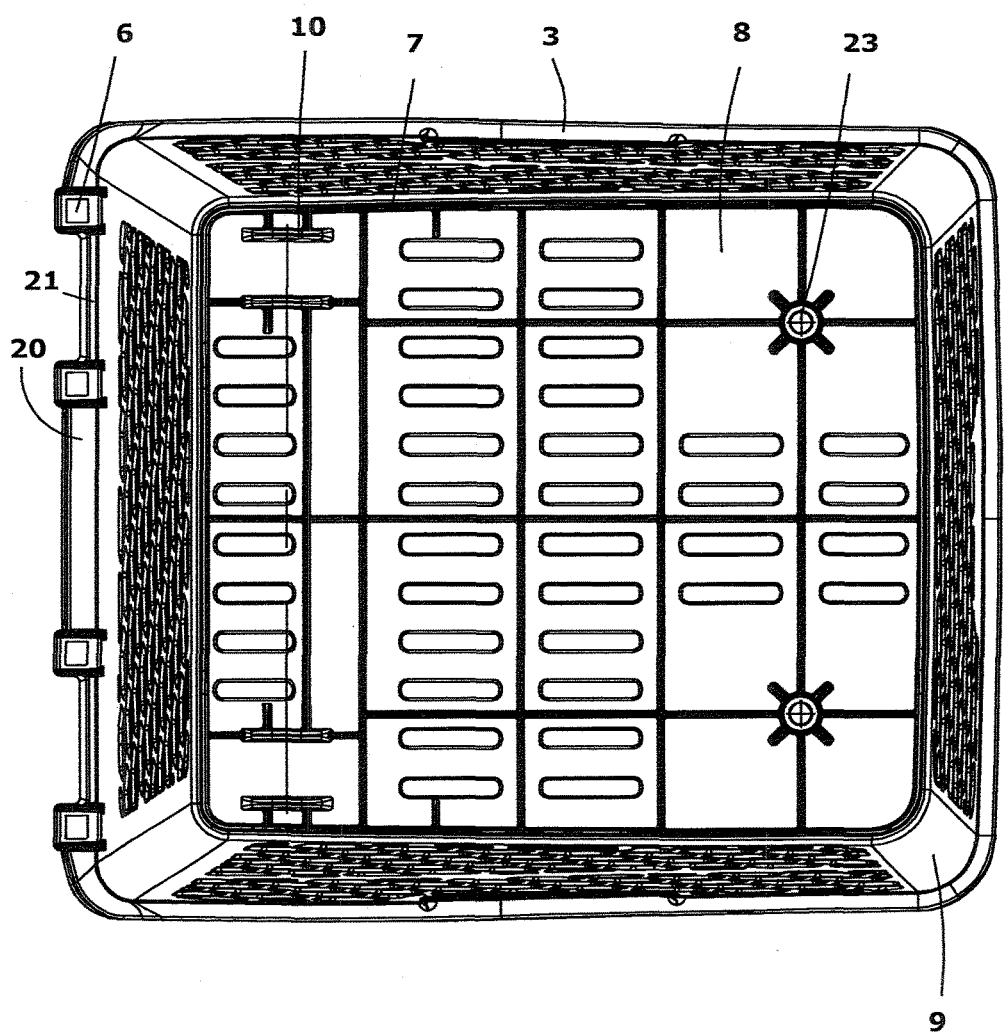
FIG. 2 shows a schematic plan view of the basket seen in FIG. 1.
Figure 3:
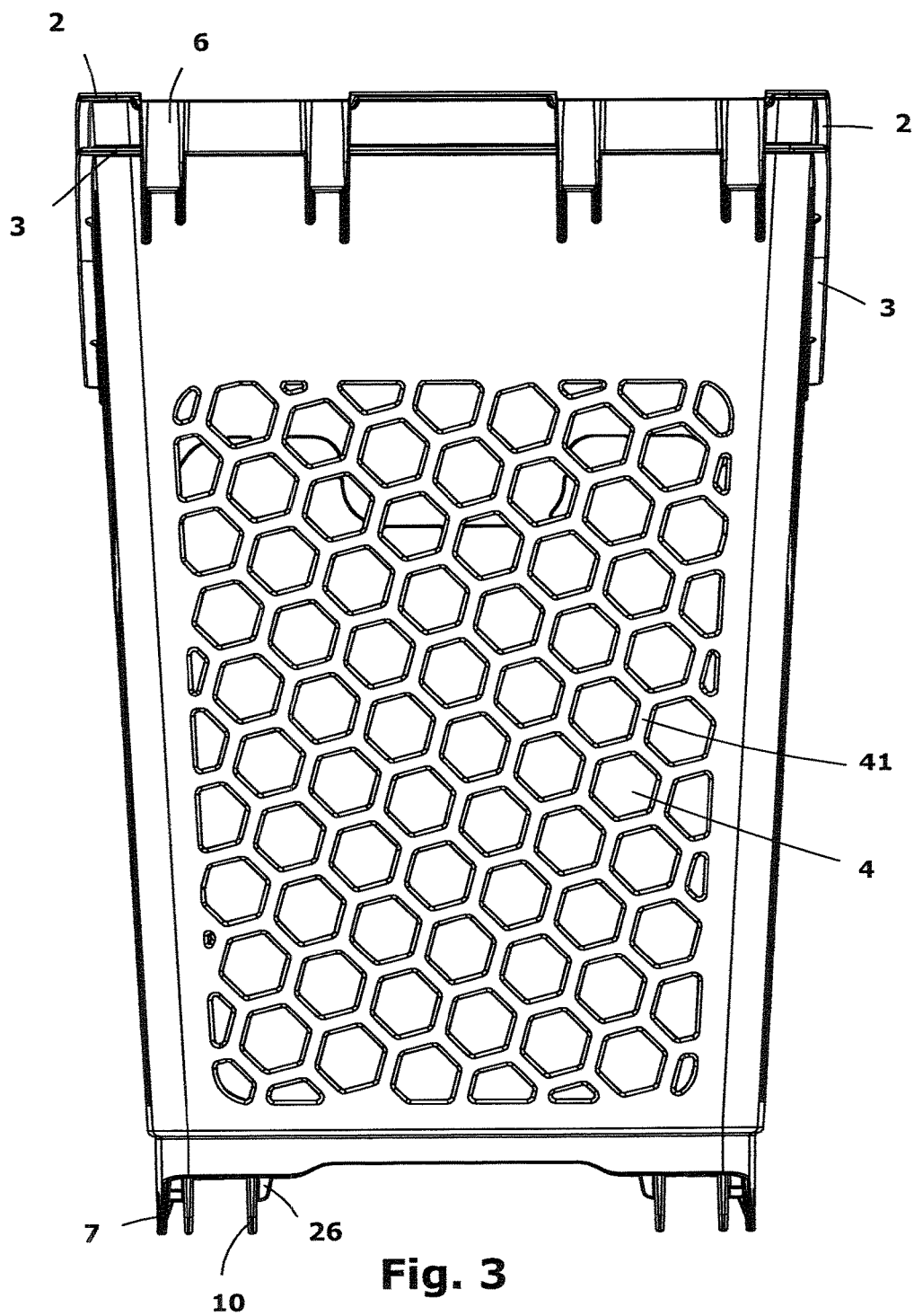
FIG. 3 shows a schematic rear view of the basket seen in FIGS. 1 and 2.
Figure 4:
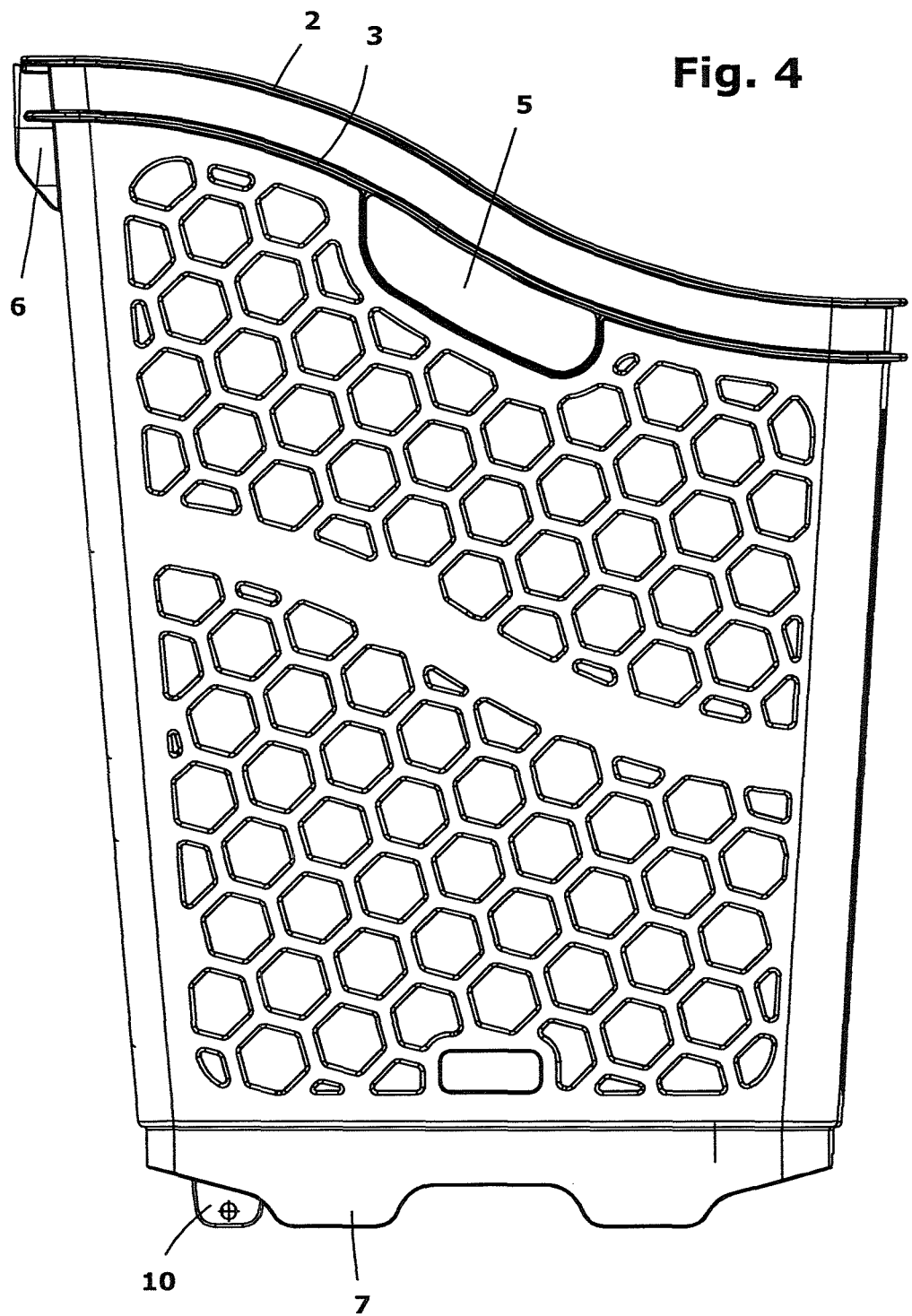
FIG. 4 shows a schematic lateral view of the basket seen in FIGS. 1 to 3.
Figure 5:
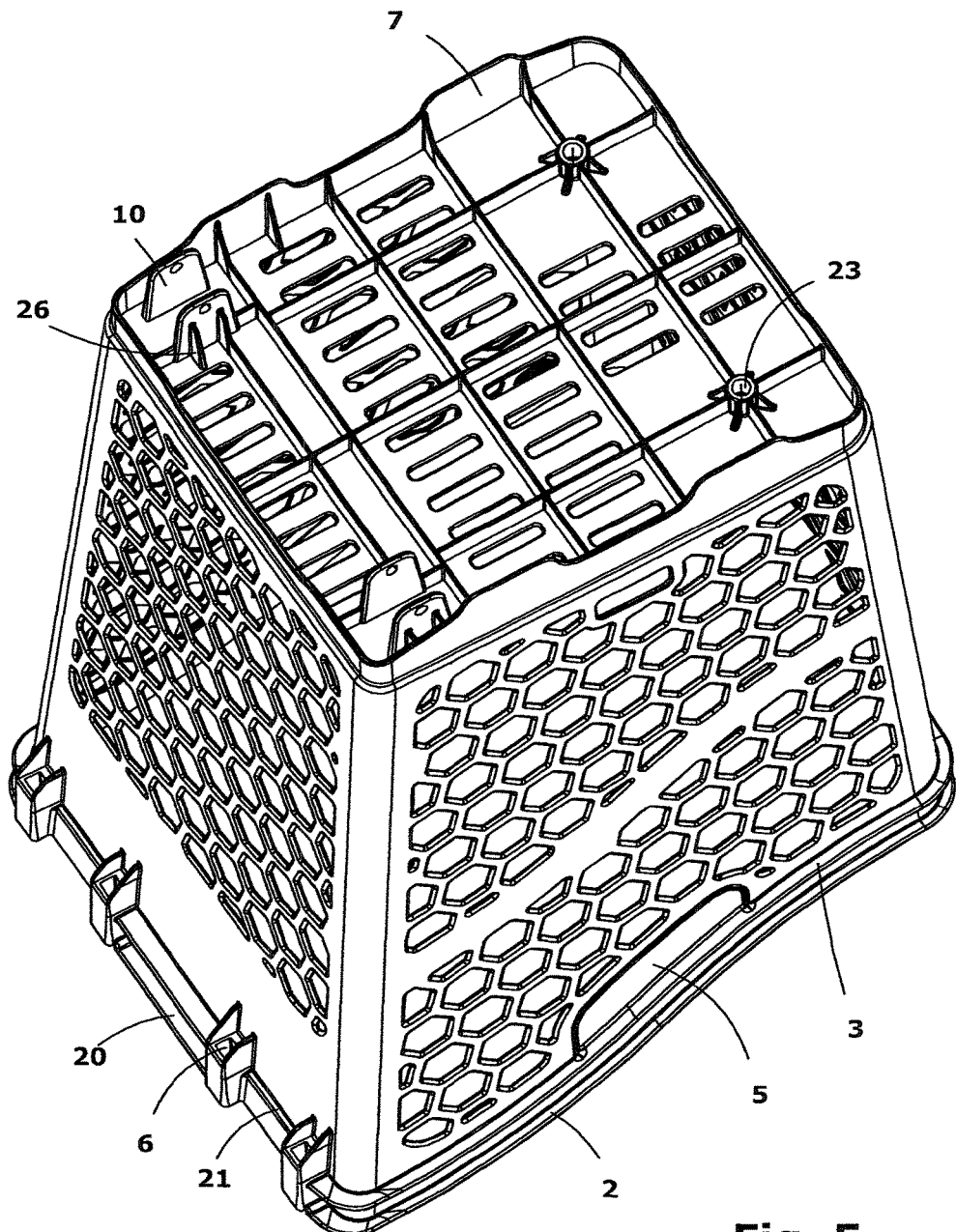
FIG. 5 shows a schematic lower perspective view of the shopping basket seen in FIGS. 1 to 4.
Figure 6:
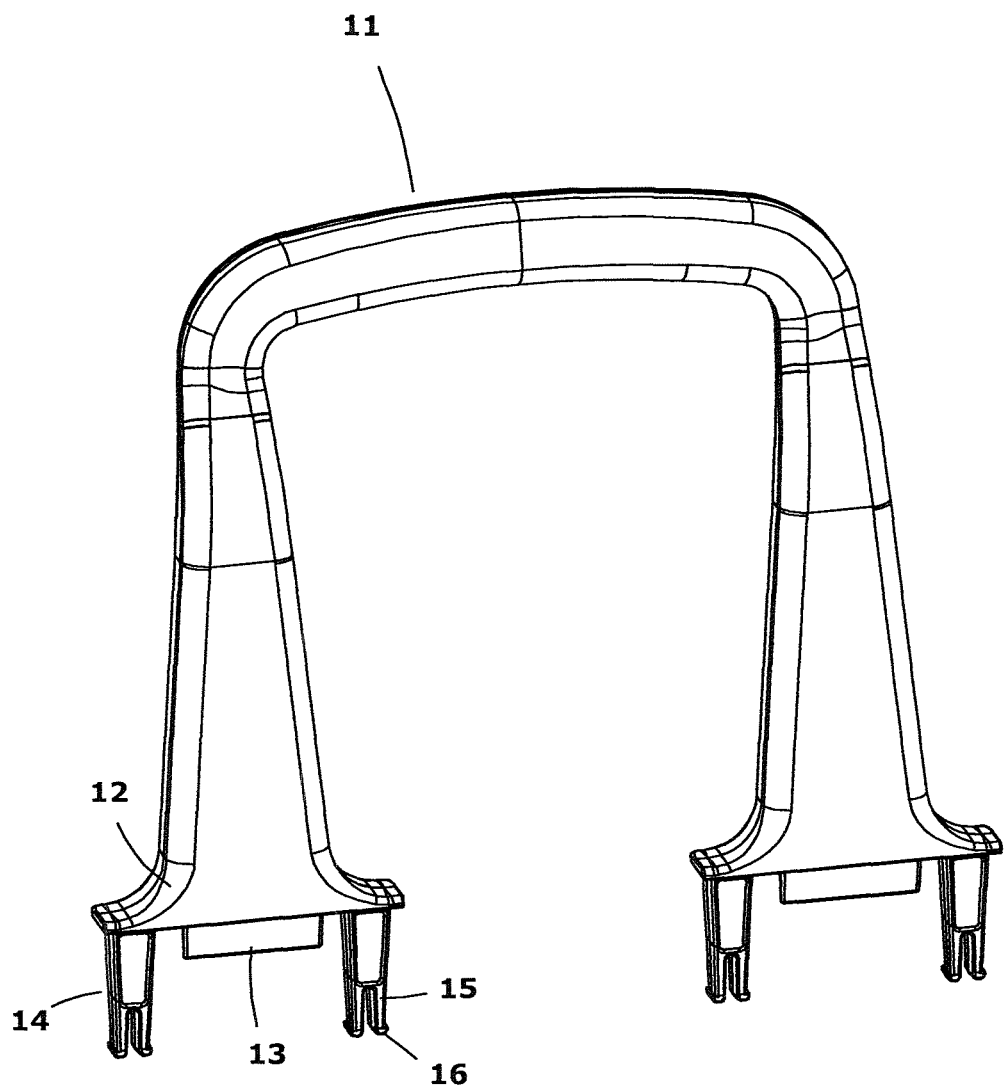
FIG. 6 shows a schematic perspective view of the handle of the basket.
Figure 7:
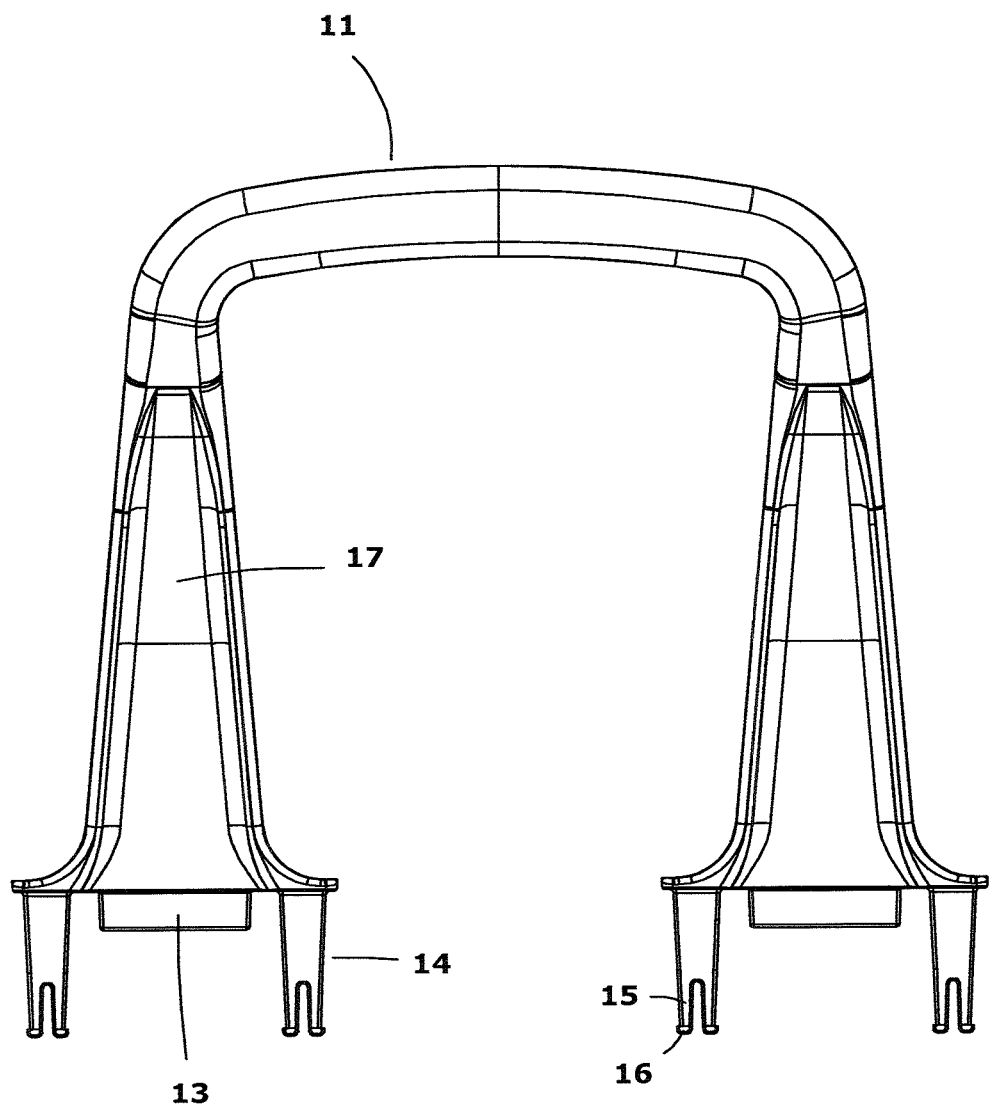
FIG. 7 shows a schematic front view of the handle seen in FIG. 6.
Figure 8:
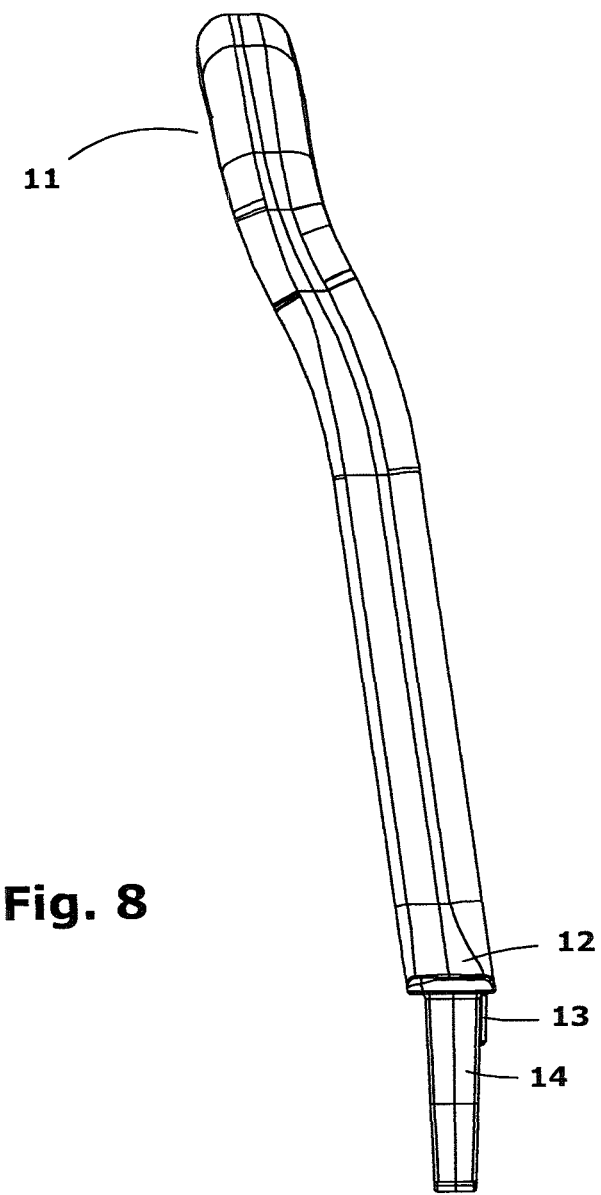
FIG. 8 shows a schematic lateral view of the handle seen in FIGS. 6 and 7.
Figure 9:
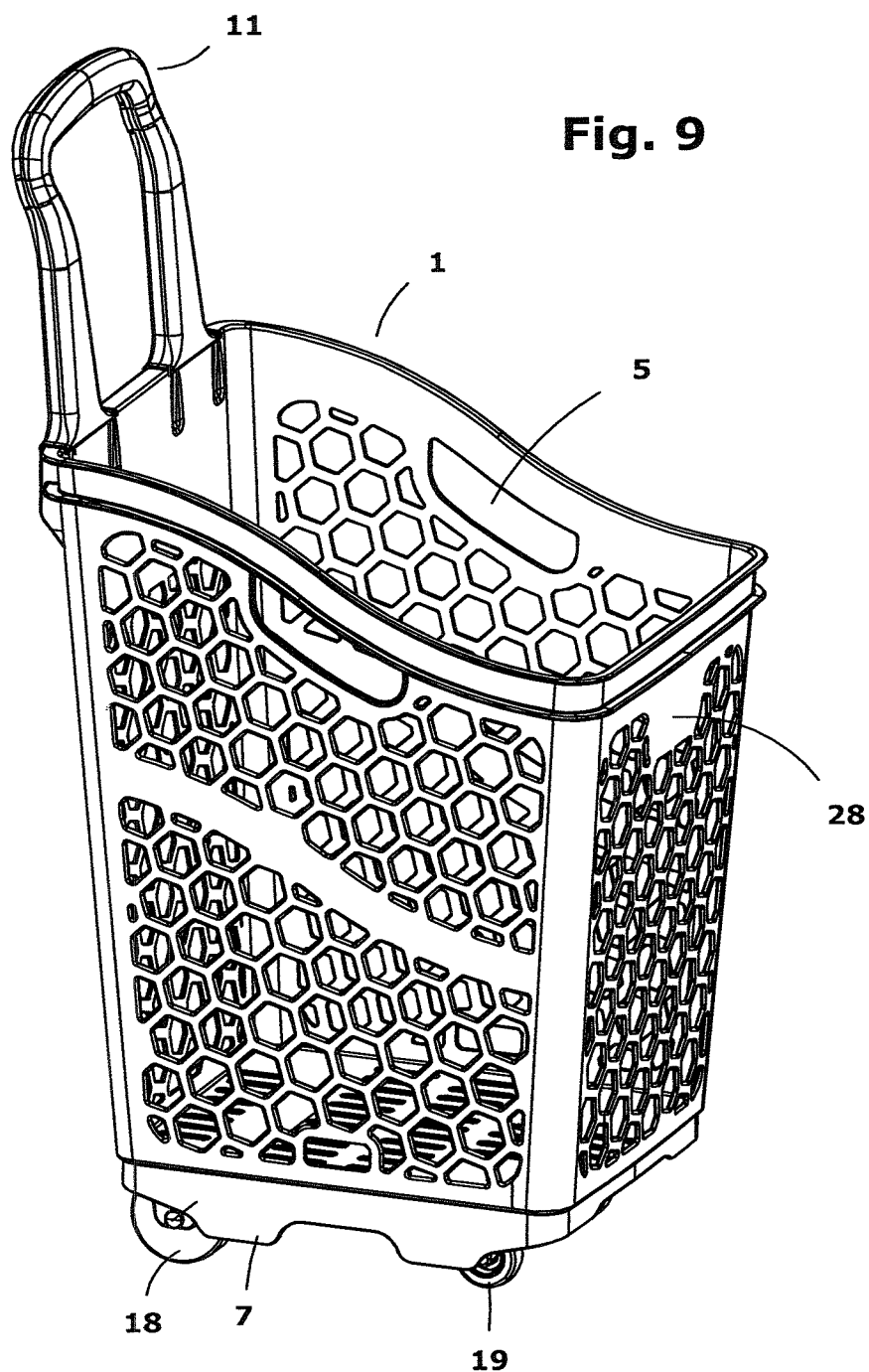
FIG. 9 shows a schematic upper perspective view of the assembly of the basket fitted with the corresponding handle.
Figure 10:
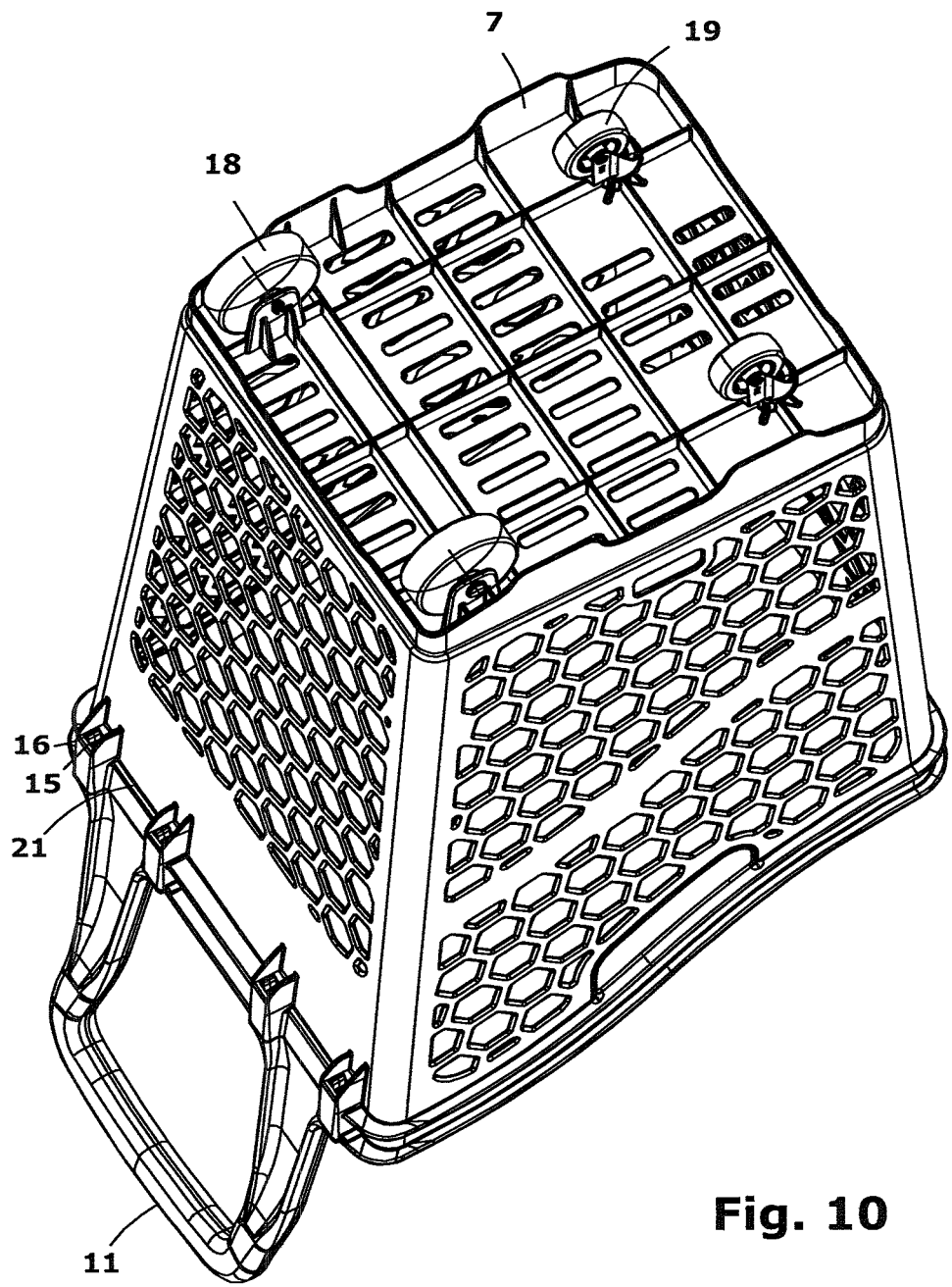
FIG. 10 shows a schematic lower perspective view of the fitted wheel assembly.

A shopping basket is described of the type used as a light means for pulling products in self-service establishments, at which it is the customer who takes certain products or others from the shelves and places them in this basket until reaching the checkout area.

The basket according to the invention is more specifically made up mainly of two bodies, different and initially separated: a main body or body of the basket (1), and a body of the handle (11). It furthermore comprises additional items such as the wheels (18,19) and the axles or wheel supports.

The basket is made up of side walls (81), a base (8) and angular rounded off joins (9) between the side walls (81). The walls are formed of a grille, in which the ribs (41) defining this form hexagonal cells (4), in which the transversal size is similar to the thickness of the plane of the wall of the basket body (1); the hexagonal shape means that the amount of material can be minimised while ensuring the greatest strength; the thickness of the ribs (41) enables the cells to be provided with minimum radii of curvature, of roughly 1 mm, so that these are not in the least aggressive for the user. The angular join (9) between each two walls is smooth, solid, with no gaps; the join between the base (8) and the lateral walls (81) forms an angle of roughly 90°, although slightly greater. The general shape of the basket is that of a truncated pyramid, though with little divergence, so that the base is narrower than the upper opening. This facilitates access of the products to the interior of the basket in the broader zone and also facilitates stacking the baskets up together.

The upper edge of the body of the basket (1) is provided with a rim (2) and preferably with a second reinforcement rim (3) set in parallel to the previous one and separated at some distance from this. These rims mean that the upper edge is given the required strength and also provide said edge with the minimum radii of curvature so as not to prove aggressive to the user.

Under this second reinforcement rim (3) there is a gap formed over the side walls of the body of the basket with two hollows forming handles (5) for manually lifting the basket; as for the ribs and edges, the radii of curvature are sufficiently large to prevent any risk of cutting for the user.

The lower part comprises a perimeter skirt (7), which minimises the entry of dirt to the lower base and at the same time conceals the wheel zone from view.

The rear wall of the basket (the one closest to the user in usage position) is provided with housings (6) for the connection with the joining items of the body of the handle (11). Said housings (6) will preferably be arranged in pairs on each side of the rear wall of the body of the basket (1). These housings (6) are made up of tubes, open at the top and bottom; in the specific embodiment represented the tubes have an essentially quadrangular section, but this shape is not limiting, as the same result could be obtained with any other section. Between the housings (6) of each pair there is a body forming a slot (21), which in cooperation with said housings (6) ensures the precise securing of the handle body (11).

The lower part of each housing (6) can be provided with a slight protuberance or wedge (22) for adjustment in the locking. Between the pairs of housings (6) there is an upper rim (20) which gives a continuity effect with the rim (2).

The lower part of the basket comprises pairs of lugs (10) in the zone close to the rear edge (to the wall carrying the handle). Between each pair of lugs (10) there is a fixed wheel (18). The lugs (10) comprises transversal reinforcements (26). In a zone close to the front edge this also comprises two housings (23) for rotating wheels (19).

The body of the handle (11) forms the handle of the basket. As has already been stated, this is a separately made body which is assembled on the body of the basket (1) for its use. It comprises two lateral portions and an upper gripping portion, in which the side portions preferably form a rear hollow (17), and an enlargement (12) in the zone of the anchorage base. From the lower ends of the enlargement emerge two anchorage rods, (14) with a section essentially identical to that of the housings (6) of the body of the basket (1); each of said anchorage rods (14) is finished off at the bottom by anchorage legs (15), preferably two for each anchorage rod (14), and these are in turn provided at the lower end with retention pawls (16). Between each pair of rods two plates (13) are preferably arranged to be inserted into the slots (21) of the body of the basket (1), when the body of the handle is fitted on the body of the basket (1). When the anchorage rods (12) of the body of the basket (11) are inserted in the housings (6) of the body of the basket (1), and the plates (13) are inserted into the slots (21) this will reach a securing position in which the anchorage legs (15) of each anchorage rod elastically return to their relaxed position, and retaining pawls (16) will emerge from the bottom of said housings (6) to prevent the handle from accidentally coming out.

For dismantling the body of the handle, for example for replacing this through breakage, all that this involves is applying pressure to the pawls (16) to elastically force the anchorage legs (15) and again moving the handle body (1) out, thus dismantling this.

It is intended for the front wall of the basket to comprise a space (28) for advertising identification.

What is claimed is:

1. A shopping basket, made of a plastic material, comprising:
   a body formed by side walls and a base, in which the body has an essentially truncated pyramid shape with a small divergence to allow the body to be stacked with another said body, and
   a handle,
   wherein the body of the basket comprises housings for the fixed and immobile securing of the handle thereto, and
   wherein the handle comprises a bottom having an arrangement for anchoring the bottom of the handle in the housings of the body of the basket,
   wherein an upper edge of the body of the basket is provided with an upper rim and a lower reinforcement rim arranged in parallel to the upper rim, and separated from the upper rim by a predetermined space.

2. A shopping basket, according to claim 1, wherein, for manually lifting the basket there are two holes forming handles in the side walls, set on opposite sides of the body of the basket and under the lower reinforcement rim.

3. A shopping basket, made of a plastic material, comprising:
a body formed by side walls and a base, in which the body has an essentially truncated pyramid shape with a small divergence to allow the body to be stacked with another said body, and
a handle,
wherein the body of the basket comprises housings for the fixed and immobile securing of the handle thereto, and
wherein the handle comprises a bottom having an arrangement for anchoring the bottom of the handle in the housings of the body of the basket,
wherein the housings are arranged in pairs on each side of a rear side wall of the body of the basket, and the housings are made up of tubes open at a top and bottom thereof.

4. A shopping basket, according to claim 3, wherein the side walls are made up of a grille with ribs defining a plurality of cells, and these ribs have a transversal dimension similar to a thickness on a plane of the corresponding side wall in the body of the basket.

5. A shopping basket, according to claim 4, wherein the cells of the side walls are hexagonally shaped.

6. A shopping basket, according to claim 4, wherein edges of the ribs have a radius of curvature not less than approximately 1 mm.

7. A shopping basket, according to claim 3, further comprising an angular join which connects edges of adjacent side walls and each angular join is rounded, smooth, solid and with no gaps.

8. A shopping basket, according to claim 3, wherein the body of the basket comprises a perimeter skirt at a base thereof.

9. A shopping basket, according to claim 3, further comprising, between the housings of each pair, a slot, which in cooperation with said housings provides precise securing for the handle.

10. A shopping basket, according to claim 9, wherein the handle includes two lateral portions, each having a lower end with a pair of anchorage rods, and a plate between each pair of the anchorage rods for insertion into the slots of the body of the basket.

11. A shopping basket, according to claim 3, wherein the body includes an upper rim between the pairs of housings which gives a continuity effect with the rim.

12. A shopping basket, according to claim 3, wherein each housing comprises one of a slight protuberance and wedge for adjustment in locking.

13. A shopping basket, according to claim 3, wherein a front wall of the body of the basket comprises a space for advertising identification.

14. A shopping basket, made of a plastic material, comprising:
a body formed by side walls and a base, in which the body has an essentially truncated pyramid shape with a small divergence to allow the body to be stacked with another said body, and
a handle,
wherein the body of the basket comprises housings for the fixed and immobile securing of the handle thereto, and
wherein the handle comprises a bottom having an arrangement for anchoring the bottom of the handle in the housings of the body of the basket,
wherein the handle comprises:
two lateral portions and
one upper portion for gripping,
wherein the lateral portions form a rear hollow, and an enlargement in a zone of an anchorage base thereof,
wherein two anchorage rods extend from a lower end of each enlargement, in concordance with, and with a section essentially equal to that of the housings of the body of the basket, and
wherein each of said anchorage rods is finished off at a bottom thereof with anchorage legs, and said anchorage legs in turn are provided with retention pawls at a bottom thereof.

15. A shopping basket, made of a plastic material, comprising:
a body formed by side walls and a base, in which the body has an essentially truncated pyramid shape with a small divergence to allow the body to be stacked with another said body, and
a handle,
wherein the body of the basket comprises a plurality of housings,
wherein the handle comprises a bottom having an arrangement for anchoring the bottom of the handle in a fixed and immobile secured manner in a single position at all times in the plurality of said housings of the body of the basket, and
wherein a bottom of the base of the basket comprises:
pairs of lugs in a zone close to a rear edge of the body corresponding to a wall carrying the handle so that between each pair of lugs there is a fixed wheel, and the lugs comprise transversal reinforcements; and
two housings in an area close to a front edge of the body for receiving rotating wheels.

16. A shopping basket, according to claim 15, wherein the side walls are made up of a grille with ribs defining a plurality of cells, and these ribs have a transversal dimension similar to a thickness on a plane of the corresponding side wall in the body of the basket.

17. A shopping basket, according to claim 16, wherein the cells of the side walls are hexagonally shaped.

18. A shopping basket, according to claim 16, wherein edges of the ribs have a radius of curvature not less than approximately 1 mm.

19. A shopping basket, according to claim 15, further comprising an angular join which connects edges of adjacent side walls and each angular join is rounded, smooth, solid and with no gaps.

20. A shopping basket, according to claim 15, wherein the body of the basket comprises a perimeter skirt at a base thereof.

* * * * *